March 12, 1929.  L. EDELMANN  1,705,443

GREASE GUN

Original Filed July 17, 1925

Inventor
Leo Edelmann
By Lloyd W. Patek
Attorney

Patented Mar. 12, 1929.

1,705,443

UNITED STATES PATENT OFFICE.

LEO EDELMANN, OF CHICAGO, ILLINOIS, ASSIGNOR TO E. EDELMANN & COMPANY, OF CHICAGO, ILLINOIS, A CORPORATION OF ILLINOIS.

GREASE GUN.

Original application filed July 17, 1925, Serial No. 44,308. Divided and this application filed July 16, 1927. Serial No. 206,343.

This invention relates to grease guns and particularly to high pressure grease guns, as set forth in my co-pending application, Serial No. 44,308, of which this is a division and continuation.

An object of my invention is to provide a grease gun structure of such form that it can be readily applied to supply lubricant to grease cups or other fittings which would otherwise be difficult to reach.

A further object resides in so constructing and assembling the parts that the gun will give and will stand a high pressure upon the grease or material being extruded without leaking.

Another object is to provide a grease gun in which the feed of lubricant is accomplished by a plunger and pressure screw, and to so construct these parts that the return of the plunger can be accomplished quickly and with facility following a pressure grease feeding stroke, and that the plunger can be fitted and fed into the barrel of the gun without difficulty.

With the above and other objects in view which will be apparent to those skilled in the art, my present invention includes certain novel features of construction and combination of parts which will be hereinafter set forth in connection with the drawing.

Figure 1:
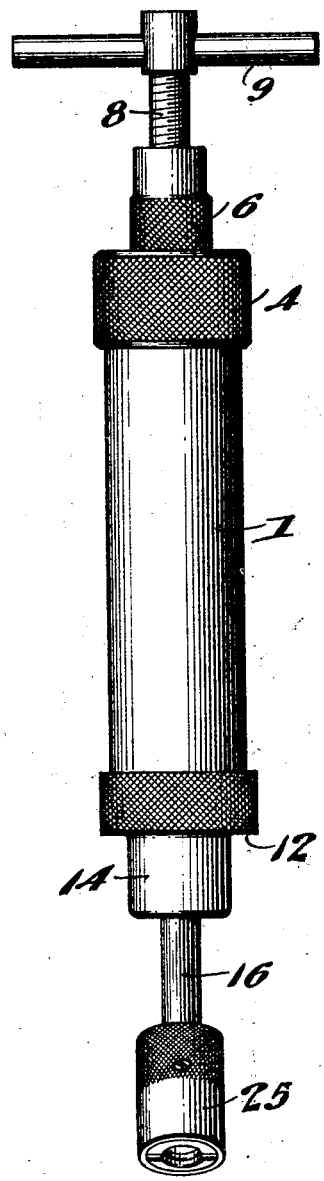
Figure 1 is a view in side elevation of a grease gun constructed in accordance with my invention.
Figure 2:
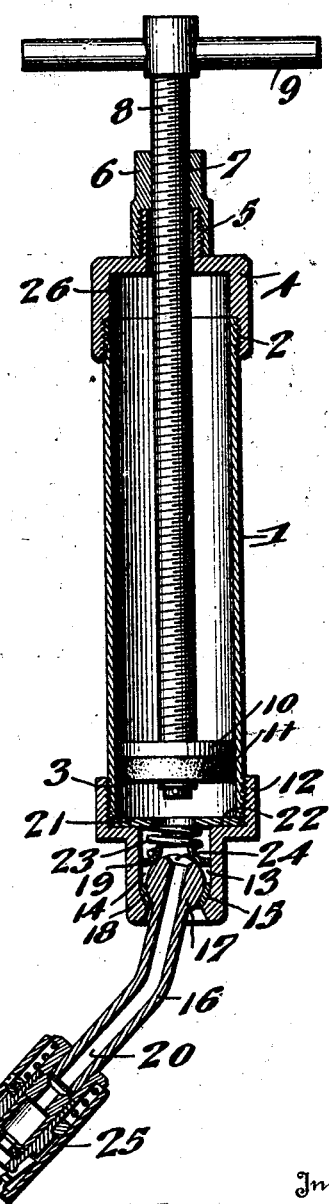
Fig. 2 is a longitudinal sectional view through the grease gun structure.

The tubular barrel 1 is screw-threaded at 2 and 3 at its ends, and a cap 4 is fitted on one end and is provided with an outwardly extending externally screw-threaded sleeve 5. A pressure nut 6 is internally threaded to be turned upon the threaded sleeve 5, and is provided with a reduced internally threaded bore 7 beyond the sleeve, and a pressure screw 8 is turned into this threaded bore.

The pressure screw 8 has a handle 9 at its outer end and its inner end carries a plunger 10, which plunger is provided with a cup washer 11 of leather or other suitable material. This plunger 10 is preferably swivelled on the end of the pressure screw 8, and the pressure screw is of a diameter to turn freely within the opening of the sleeve 5.

A cap 12 is provided to be turned onto the threaded end 3 of the barrel 1, and has a central bore 13 formed therethrough substantially axially in line with the pressure screw 8. This bore is formed through an extension sleeve 14, and at the end of the sleeve the bore is slightly reduced to provide a ball socket 15.

An extension nozzle 16 has a ball joint 17 on one end adapted to fit within the ball socket 15, and a packing ring 18 is provided between the ball and socket. A curved ring washer 19 is provided to fit within the bore 13 against the inner side of the ball portion 17, and is open in its center to leave a free opening to the passage 20 through the ball 17 and the extension nozzle 16.

A ring washer 21 is provided to be fitted within the cap 12 and is pressed down by the end of the barrel 1 to engage with a shoulder 22 formed around the bore 13. A coil spring 23 is mounted between this washer 21 and the bearing washer 19, and this spring 23 exerts pressure upon the washer 19 to hold the ball portion 17 in a proper fit against the packing washer 18 in the socket bearing 15. With this arrangement of the parts the bearing ball 17 has a grease tight fit within the socket at all times, and the pressure of grease extruded through the passage 20, upon the inner side of the ball 17, will aid in maintaining this tight fit.

To insure an unobstructed flow of grease through the passage 20, it is preferable that the end of the passage 20 where it opens through the ball portion 17 be reamed or otherwise enlarged as at 24.

Any form or type of coupling, which is indicated at 25 can be used to connect the nozzle 16 with grease cups, grease fittings and other parts to have lubricant supplied thereto.

With the swivel or universal mounting of the nozzle 16, it will be found desirable to load the barrel of my improved grease gun through the outer threaded end at 2, and this requires withdrawal of the pressure screw 8 and plunger 10. In grease guns as now constructed difficulty is experienced in refitting the plunger into the barrel after withdrawal of the same, as the cup washer 11 expands as soon as withdrawn and this cannot be readily replaced within the outer end of the barrel. To overcome this difficulty I make the cap 4 of greater length than is required to embrace the screw threaded portion 2 and reduce the inner bore of the cap to be of substantially the same diameter as the inner diameter of the barrel. With this construction the plunger 10 can be drawn back into the cap to such an extent that the cup washer 11 is entirely within this reduced bore at 26, and in re-assembling the parts the cap is turned onto the threaded end 2 and the plunger can then be fed forward into the barrel through the medium of the pressure screw 8 without danger of the cup washer being displaced or damaged. Also, with this construction it is possible to fill the barrel 1 with grease entirely up to its end and the gun can be assembled without the possibility of any of the grease being squeezed out around the barrel by the plunger 10, as the parts are assembled.

By passing the pressure screw 8 loosely through sleeve 5 and providing the pressure nut 6, it is possible to remove the pressure nut and spin the same upon the pressure screw to feed the screw back when the gun is to be reloaded, and thus the tedious operation of turning the screw to accomplish this feed back is avoided.

While I have herein shown and described only certain specific embodiments of this invention, it will be appreciated that changes and variations can be resorted to in the form, construction and arrangement of the parts without departing from the spirit and scope of my invention.

I claim:

1. A grease gun comprising a barrel open at one end, a cap to be removably fitted to close said open end provided with a bearing socket, a grease nozzle having a bearing portion fitted within said socket for universal movement, and a retaining washer fitted within the cap and held in place by the barrel to retain said bearing portion within the socket.

2. A grease gun comprising a barrel open at one end, a cap to be removably fitted to close said open end provided with a central passage and having a socket bearing therein, a grease nozzle provided with a bearing portion at one end to fit within the socket for universal movement, a washer fitted within the cap and held in place by connection of the barrel therewith, and a spring confined by said washer to hold the bearing portion within the socket.

3. A grease gun comprising a barrel open at one end, a cap to be removably fitted to close said open end provided with a central passage and having a socket bearing therein, a grease nozzle provided with a bearing ball at one end to fit within the socket, a washer fitted within the passage of the cap to bear upon the inner side of the ball, a second washer fitted within the cap and secured in place by contact with the end of the barrel, and a spring confined between said washers.

4. A grease gun comprising a barrel open at one end and externally screw threaded, a cap threaded to fit upon the barrel provided with a sleeve portion open at its end and having a socket bearing adjacent said open end, a grease nozzle provided with a bearing ball at one end to fit within the socket, a packing gasket between said bearing ball and said socket, a curved washer fitted within the sleeve in contact with the bearing ball, a washer fitted within the cap and of sufficient diameter to be engaged and held in place by the end of the barrel when screwed into the cap, and a coil spring fitted between said washer and the curved washer.

In testimony whereof I hereunto affix my signature.

LEO EDELMANN.